United States Patent [19]

Gunji

[11] Patent Number: 5,286,086
[45] Date of Patent: Feb. 15, 1994

[54] AUXILIARY CHILD SEAT UNIT FOR A VEHICLE

[75] Inventor: Rikimasa Gunji, Tokyo, Japan

[73] Assignee: Combi Corporation, Tokyo, Japan

[21] Appl. No.: 966,334

[22] Filed: Oct. 26, 1992

[30] Foreign Application Priority Data

Feb. 3, 1992 [JP] Japan .................. 4-10641[U]

[51] Int. Cl.$^5$ ............................................. B60N 2/28
[52] U.S. Cl. ............................. 297/250.1; 297/232
[58] Field of Search ............ 297/191, 250, 232, 488, 297/464, 218, 219, 229, 487

[56] References Cited

U.S. PATENT DOCUMENTS

| | | | |
|---|---|---|---|
| 361,882 | 4/1887 | Luft | 297/191 X |
| 2,489,087 | 11/1949 | Hewit, Jr. | 297/250 X |
| 3,596,986 | 8/1971 | Ragsdale | 297/250 X |
| 4,679,852 | 7/1987 | Anthony et al. | 297/464 |
| 4,770,468 | 9/1988 | Shubin | 297/487 |
| 4,880,277 | 11/1989 | Takahashi et al. | 297/484 X |
| 5,061,012 | 10/1991 | Parker et al. | 297/250 X |
| 5,098,161 | 3/1992 | Minami et al. | 297/464 |

*Primary Examiner*—James R. Brittain
*Assistant Examiner*—Milton Nelson, Jr.
*Attorney, Agent, or Firm*—Sughrue, Mion, Zinn, Macpeak & Seas

[57] ABSTRACT

An auxiliary child seat unit for a vehicle which has seat belt holes provided in sides of a lower rear part of the auxiliary child seat unit, through which seat belts are placed to allow the auxiliary child seat unit to be stably fastened to an interior of the vehicle. A seat belt connection opening is provided within the auxiliary child seat unit between the seat belt holes wherein the seat belts are attached by an engagement mechanism provided on the seat belts.

8 Claims, 4 Drawing Sheets

AUXILIARY CHILD SEAT UNIT FOR A VEHICLE

BACKGROUND OF THE INVENTION

The present device relates to an auxiliary child seat unit for use with a seat of a motor vehicle.

It has been widely practiced to attach an auxiliary child seat unit to the seat of a motor vehicle to secure the safety of a child. The auxiliary child seat unit is usually fastened to the seat of the vehicle by a seat belt provided in the vehicle, such that the auxiliary child seat unit is safely secured during regular movement of the vehicle and during sudden stops of the vehicle.

Generally, sides of the auxiliary child seat unit or a bottom thereof have belt holes through which a seat belt with an engagement plate is inserted, to fasten the auxiliary child seat unit to the seat of the vehicle. Specifically, the seat belt with the engagement plate is inserted through the belt holes and connected outside the auxiliary child seat unit with another seat belt containing an engagement means for receiving the engagement plate, thereby securing the auxiliary child seat unit to the seat of the vehicle.

In conventional devices, the operation of connecting the seat belts by engaging the engagement plate with the engagement means to fasten the auxiliary child seat unit to the seat of the motor vehicle is performed in a narrow place outside the auxiliary child seat unit. For that reason, it is difficult to change the length of the seat belts and thus tighten the seat belts to properly fasten the auxiliary child seat unit to the seat of the vehicle. In addition to this problem, given that the engagement means of the seat belt is exposed outside the body of the auxiliary child seat unit, the child secured in o the auxiliary child seat unit is able to touch the engagement means. This may result in the engagement plate being disengaged from the engagement means or in the child having his or her finger pinched by the engagement means.

SUMMARY OF THE INVENTION

The present device was made in order to overcome the above mentioned problems. Accordingly, it is an object of the invention to provide an auxiliary child seat unit in which engagement members, which are attached to seat belts of a vehicle, are engaged with each other in a back portion of a body of the auxiliary child seat unit, such that the seat belts can be easily adjusted to properly secure the auxiliary child seat unit to the seat of the vehicle.

It is another object of the device to provide an auxiliary child seat unit in which the engagement members, which are engaged with each other to fasten the auxiliary child seat unit to the seat of the vehicle, are located inside the auxiliary child seat unit. This feature will prevent the child from touching the engagement members and undesirably disengaging the engagement members from each other, thereby resulting in a safer auxiliary child seat unit.

The auxiliary child seat unit in accordance with the present invention has a body including a seat, a back which extends from the rear edge of the seat, and side portions such that the auxiliary child seat unit is shaped like an L. The auxiliary child seat unit has seat belt holes positioned at a lower rear side of the body and the back of the body has a seat belt connection opening placed between the seat belt holes at a same height as the seat belt holes. This configuration allows the seat belts to be inserted into the seat belt holes and connected to each other within the seat belt connection opening.

According to the present invention, the operation of connecting the seat belts to each other to fasten the auxiliary child seat unit to the seat of a vehicle can be performed in the seat belt connection opening extending in the widthwise direction of the body of the auxiliary child seat unit. For that reason, the seat belts can be connected to each other in a very easy and simple manner.

Further, being that the seat belts are connected to each other within the seat belt connection opening, the engagement members connecting the seat belts are hidden in the body of the auxiliary child seat unit. Thus, a child secured in the auxiliary child seat unit is precluded from touching the engagement members connecting the sea belts and accordingly disengaging the seat belts or injuring his or her finger.

DESCRIPTION OF THE PREFERRED EMBODIMENTS

Figure 1:
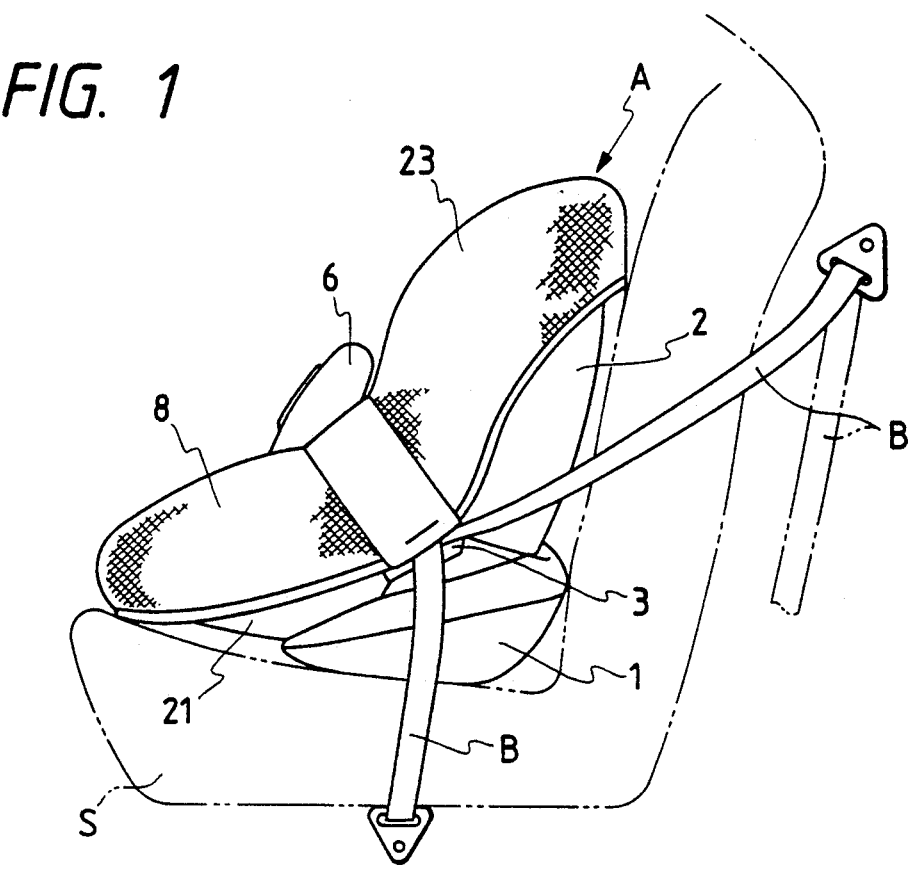
FIG. 1 is a side view of an auxiliary child seat unit according to the invention.

FIG. 1 shows an auxiliary child seat unit A fastened to a seat S of a motor vehicle in which a child is secured during movement of the vehicle. The auxiliary child seat unit A includes a base 1, and a body 2 positioned on the top of the base 1.

Figure 2:
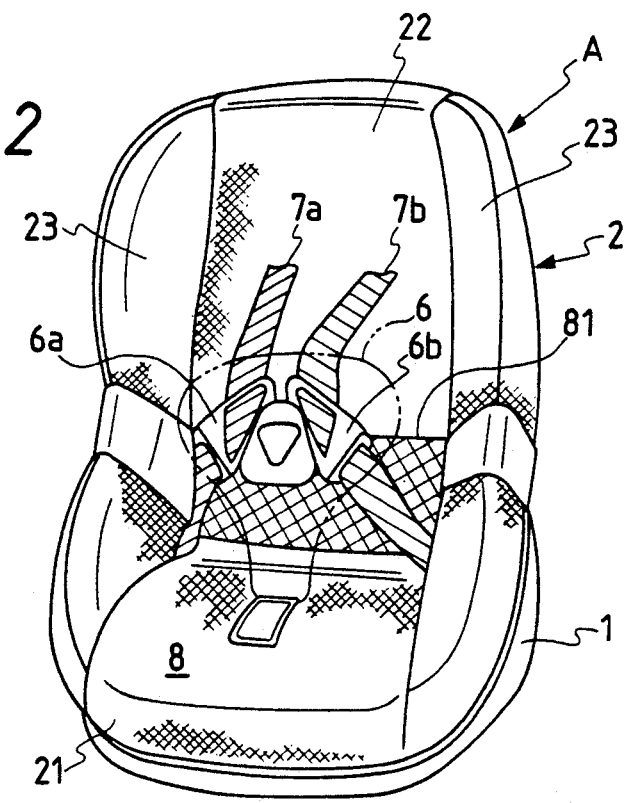
FIG. 2 is a perspective view of the inventive auxiliary child seat unit.

Referring to FIG. 2, the body 2 has a seat 21 and a back 22 extending from a rear edge of the seat 21 such that the body 2 is shaped like an L. The body 2 also has side portions 23 projecting from both sides of the seat 21 and the back 22 by a prescribed height to prevent the child from moving sideward while secured in the auxiliary child seat unit A. As illustrated in FIG. 1, seat belt holes 3 are provided on both sides of the auxiliary child seat unit A at a lower rear part of the body 2, to allow the auxiliary child seat unit A to be stably fastened to the seat S by the seat belt B of the vehicle. The seat belt holes 3 are provided at a boundary between the seat 21 and the back 22 and maintain a size that can accommodate an engagement means provided at the end of the seat belt B, thereby allowing the seat belt B to be inserted through the seat belt holes 3.

Figure 5:
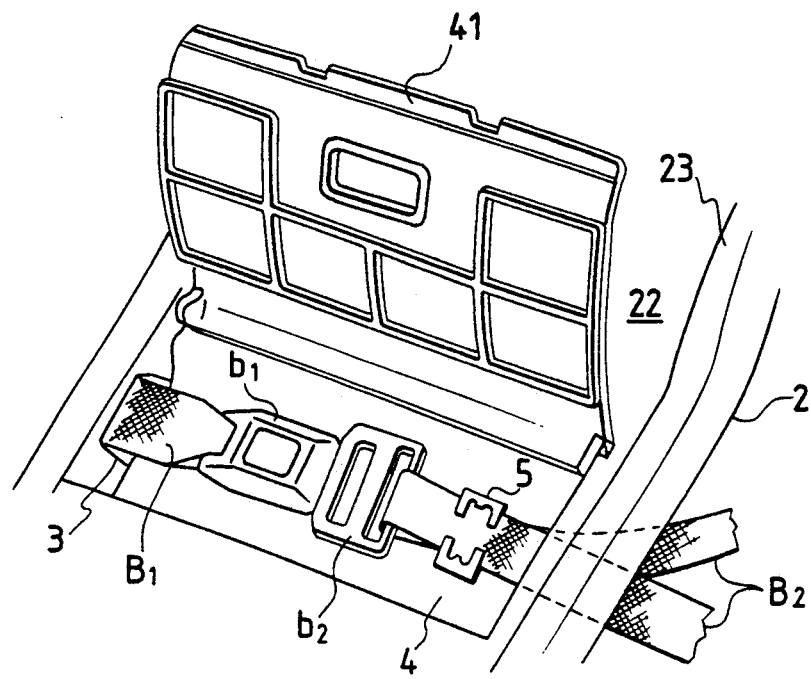
FIG. 5 is an enlarged partial perspective view of the inventive auxiliary child seat unit in a state where an engagement means and an engagement plate for seat belts are engaged with each other in a belt connection opening.

As shown in FIG. 5, the back 22 has a seat belt connection opening 4 provided between the seat belt holes 3 at a same height as the seat belt holes 3. A cover plate 41 is also provided for closing the seat belt connection opening 4, where an upper edge of the cover plate 41 is pivotally coupled to an upper edge of the opening 4 so that the cover plate 41 can be either opened or closed.

Figure 7:
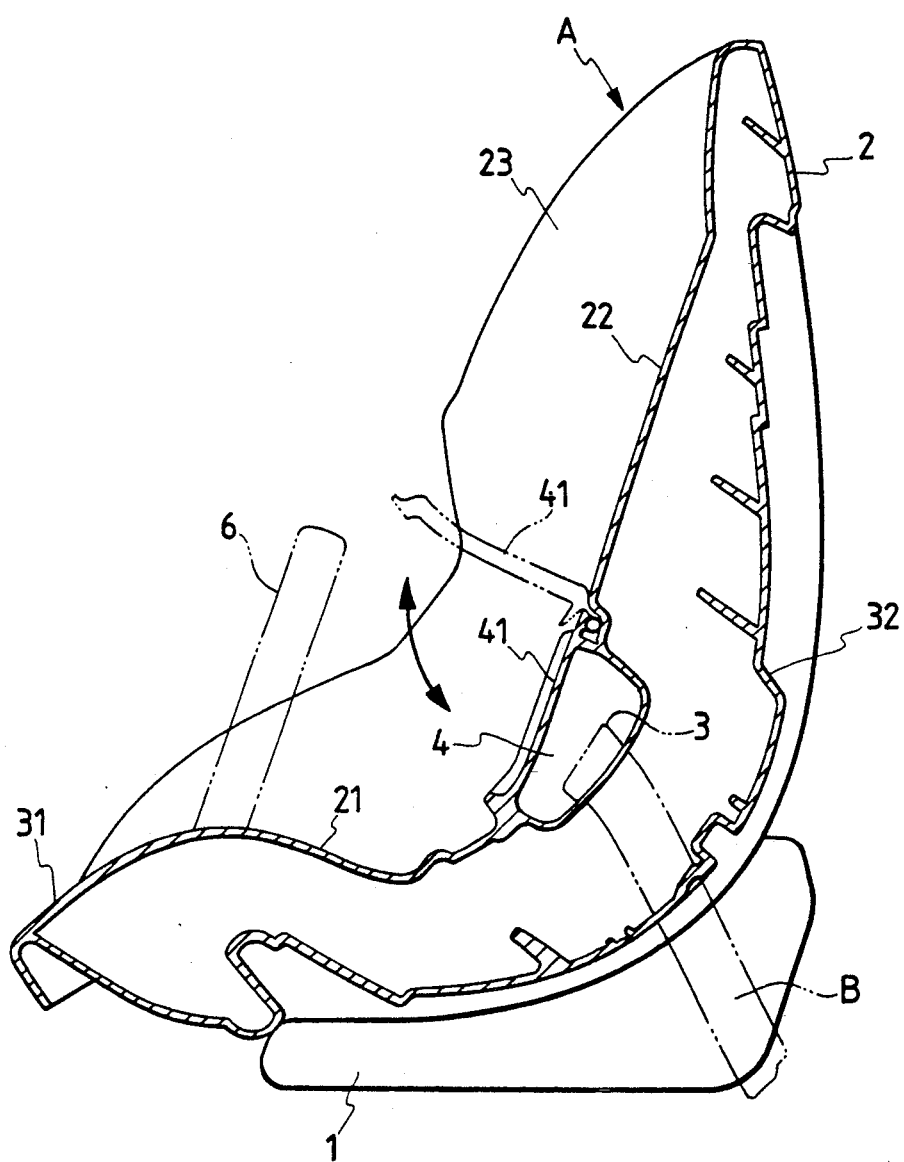
FIG. 7 is a longitudinal sectional view of the inventive auxiliary child seat unit.

As shown in FIG. 7, the body 2 mounted on the base 1, is a hollow structure made of front and rear o plates 31 and 32. The front plate 31 is recessed backward so that the belt connection opening 4 is formed on the front plate 31. The body 2 is not limited to this structure and may be formed of a single hard plate having the belt holes 3 and the belt connection opening 4. Further, the body 2 may be of such a structure where the base 1 is not required.

As shown in FIG. 5, the auxiliary child seat unit A is secured by connecting seat belt B1 and seat belt B2. In addition, the seat belt B2 is also provided with a buckle 5 such that the seat belts B1 and B2, when connected, constitute a three-portion seat belt.

One end of seat belt B1 is provided with an engagement means b1, whereas an intermediate part of seat belt B2 is provided with an engagement plate b2. The engagement means b1 and the engagement plate b2 constitute a conventional engagement mechanism for connecting the seat belts B1 and B2.

Figure 6:
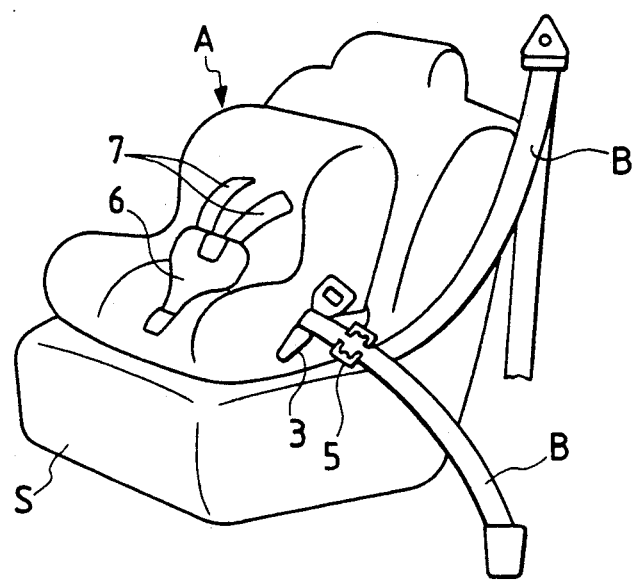
FIG. 6 is a perspective view of an auxiliary child seat unit according to the invention in which a buckle is provided outside the belt connection opening.

A first portion of the seat belt B2 extends from the engagement plate b2 and through the buckle 5. Similarly, a second portion of the seat belt B2 extends from the engagement plate b2 and through the buckle 5, such that both portions of the seat belt B2 are coupled together by the buckle 5. Thus, after the engagement plate b1 and the engagement plate b2 are attached, the buckle 5 can be adjusted to securely fasten the auxiliary child seat unit A to the seat S of the vehicle. As shown in FIG. 5, the buckle 5 may be located near the engagement plate b2, or in the alternative and referring to FIG. 6, located outside the unit body 2.

Figure 3:
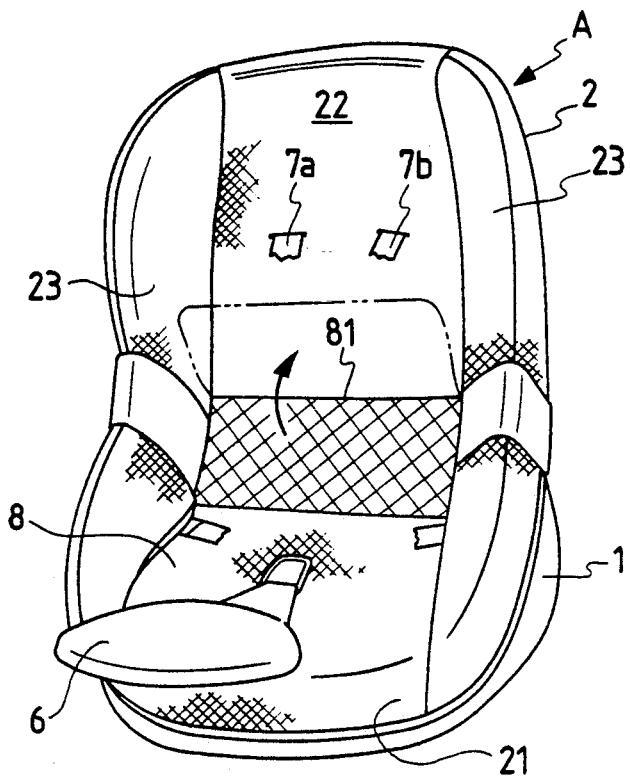
FIG. 3 is a perspective view of the inventive auxiliary child seat unit in a state where a leg support member is placed in a downward position.

As illustrated in FIG. 3, the auxiliary child seat unit A also includes a leg support member 6, two child holding belts 7a and 7b, and a cushion material 8. The leg support member 6 extends from a front edge of the seat 21, and can be rotated in either a forward or backward direction.

As shown in FIG. 2, the leg support member 6 is used for supporting the legs of the child secured in the auxiliary child seat unit A, and also for supporting the child holding belts 7. The child holding belts 7a and 7b extend from an upper portion of the back 22 of the body 2, and are respectively anchored on right and left side portions of the seat 21. The child holding belts 7a and 7b are secured to the back 22 of the body 2 by an automatic retracting means (not shown) that allows the belts 7a and 7b to be released from the back 22 by application of a force and automatically retracted to the back 22 upon removal of the force.

Intermediate portions of the belts 7a and 7b are further secured to engaging means 6a and 6b placed on the leg support member 6 to safely secure the child when placed in the auxiliary child seat unit A.

The automatic retracting means and the engaging means are conventional mechanisms know in the art. Accordingly, a detailed description of these mechanisms has been omitted as being unnecessary to those skilled in the art.

A cushion material 8 is provided to cover the body 2 and absorb a shock that the child, secured in the auxiliary child seat unit A, may receive during the movement of the vehicle. The material 8 consists of a cloth and an elastic sheet made of sponge or the like joined to an inner side of the cloth. As shown in FIG. 3, the cushion material 8 has a partially removable portion 81 which is located over the seat belt connection opening 4 located on the back 22 of the body 2 and is the same size as the cover plate 41. The removable portion 81 can be removed from a remaining portion of the material 8 to make it possible to easily open and close the cover plate 41.

Figure 4:
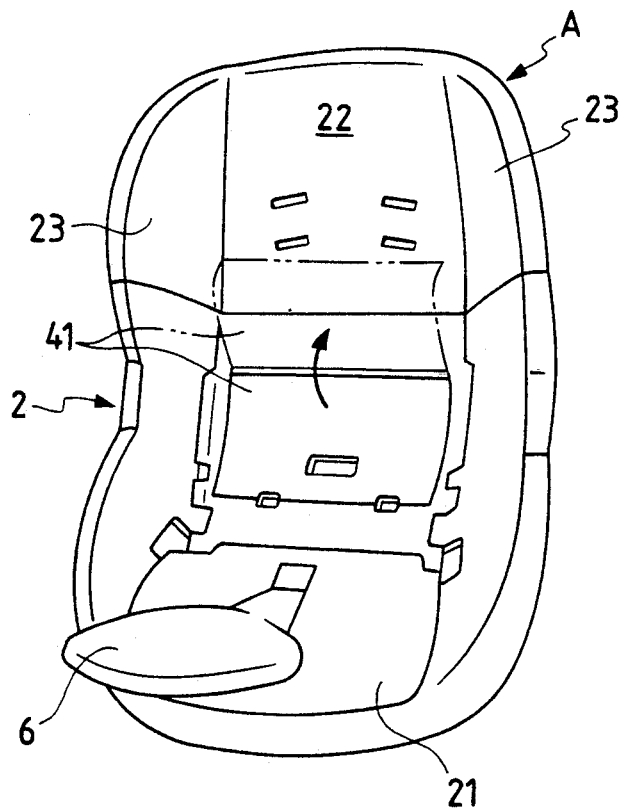
FIG. 4 is a perspective view of the inventive auxiliary child seat unit in a state where the leg support member is placed in a downward position when a cushion material is removed from the unit.

Operationally, the auxiliary child seat unit A is first put on the seat S of the vehicle. As shown in FIG. 3, the removable portion 81 of the cushion material 8 is then opened upwardly from the remaining portion as indicated by an arrow and a two-dot chain line. As shown in FIG. 4, the cover plate 41 provided under the removable portion 81 is then opened upwardly from the remaining portion of the back 22 as indicated by an arrow and a two-dot chain line. Referring to FIG. 5, the two seat belts B1 and B2 are then partly inserted into the belt connection opening 4 through the seat belt holes 3 positioned on both sides of the lower rear part of the body 2. The engagement means b1 connected to seat belt B1 and the engagement plate b2 connected to seat belt B2 are engaged with each other in the belt connection opening 4, such that the auxiliary child seat unit A is securely fastened to the seat S of the vehicle.

What is claimed is:

1. An auxiliary child seat unit for securing a child in a vehicle comprising:
    a body, said body comprising:
        a seat;
        a back extending up from a rear edge of said seat;
        seat belt holes disposed in sides of a lower rear part of said body through which seat belts may be placed to allow the auxiliary child seat unit to be stably fastened in the vehicle;
        a seat belt connection opening provided within said body between said seat belt holes, said seat belt connection opening defining a space in which the seat belts can be attached by an engagement means provided on the seat belts; and
        a cover plate for said seat belt connection opening, wherein said cover plate is rotatably attached to said seat belt connection opening, such that said cover plate can be rotated to a position which covers the seat belt connection opening.

2. An auxiliary seat unit according to the claim 1, wherein said seat belt connection opening is formed by a recess located in a portion of said back.

3. An auxiliary child seat unit according to claim 1, further comprising:
    a cushion material covering said body,
    wherein said cushion material has a removable portion placed over said seat belt connection opening, said removable portion being at least partially removable from said cushion material to provide access to said seat belt connection opening.

4. An auxiliary child seat unit according to claim 1, further comprising:
    a leg support member extending from a front edge of said seat, said leg support member being coupled to said body so as to be rotatable in a frontward and backward direction thereof.

5. An auxiliary child seat unit according to claim 1, wherein said seat belt connection opening is within said back and between side portions thereof.

6. An auxiliary child seat unit according to claim 1, further comprising portions which project from side edges of said seat by a prescribed height.

7. An auxiliary child seat unit for securing a child in a vehicle, comprising:

a body, said body comprising:

a seat portion;

a back portion extending up from a rear part of said seat portion;

seat belt holes disposed in sides of a lower rear part of said body through which seat belts may be placed to allow the auxiliary child seat unit to be stably fastened in the vehicle; and means for preventing the child from touching the seat belts, said means comprising a connection opening for accommodating the seat belts, the connection opening being disposed within said back portion and between said seat belt holes, and closing means for closing the connection opening, thereby preventing the child from touching the seat belts accommodated in the connection opening.

8. An auxiliary child seat unit according to claim 7, wherein said means for closing comprises a cover plate rotatably connected to said body.

* * * * *